(12) United States Patent
Kay

(10) Patent No.: US 8,959,829 B2
(45) Date of Patent: Feb. 24, 2015

(54) RODENT TRAP MOUNTING MEMBER AND METHOD

(76) Inventor: Daniel Kay, Harbor Springs, MI (US)

(*) Notice: Subject to any disclaimer, the term of this patent is extended or adjusted under 35 U.S.C. 154(b) by 173 days.

(21) Appl. No.: 13/441,615

(22) Filed: Apr. 6, 2012

(65) Prior Publication Data

US 2013/0263494 A1    Oct. 10, 2013

(51) Int. Cl.
*A01M 23/00* (2006.01)
*A01M 23/30* (2006.01)

(52) U.S. Cl.
CPC .................................. *A01M 23/00* (2013.01)
USPC ............................... 43/96; 43/58; 43/81

(58) Field of Classification Search
CPC ..... A01M 23/24; A01M 23/26; A01M 23/00; A01M 23/245; A01M 23/28; A47G 29/08; F21V 21/088; F21V 21/096
USPC .......... 43/58, 81, 81.5, 88, 96, 97; 248/316.7, 248/346.04, 229.26
IPC .................... A01M 23/24, 23/26, 23/28, 23/30, A01M 23/36, 23/00
See application file for complete search history.

(56) References Cited

U.S. PATENT DOCUMENTS

| | | | |
|---|---|---|---|
| 2,332,334 A | 10/1943 | Morrison | |
| 3,202,291 A * | 8/1965 | Root | 211/49.1 |
| 3,303,600 A | 2/1967 | Freeman | |
| 4,026,064 A | 5/1977 | Baker | |
| 4,161,079 A | 7/1979 | Hill | |
| 4,342,172 A | 8/1982 | Guanci | |
| 4,424,640 A | 1/1984 | Cook | |
| 4,453,337 A | 6/1984 | Williams | |
| 4,619,071 A | 10/1986 | Willis | |
| 4,658,536 A | 4/1987 | Baker | |
| 4,719,718 A | 1/1988 | Kon | |
| 4,823,504 A | 4/1989 | Ronning | |
| 5,136,803 A | 8/1992 | Sykes et al. | |
| 5,175,956 A | 1/1993 | Hover, Sr. et al. | |
| 5,327,673 A | 7/1994 | Paglia et al. | |
| 5,448,852 A | 9/1995 | Spragins et al. | |
| 5,477,635 A | 12/1995 | Orsano | |
| 5,682,705 A | 11/1997 | Stahl | |
| 5,771,628 A | 6/1998 | Nobbs | |
| 5,791,609 A * | 8/1998 | Hankins | 248/124.1 |
| 5,806,237 A | 9/1998 | Nelson et al. | |
| 5,857,430 A * | 1/1999 | Griffiths | 119/256 |
| 5,950,353 A * | 9/1999 | Johnson et al. | 43/58 |

(Continued)

FOREIGN PATENT DOCUMENTS

EP    02084962       8/2009
FR    2627953 A1 *  9/1989 ............ A01M 23/26

(Continued)

OTHER PUBLICATIONS

Machine translation of FR 2627953 to Faverot et al., published Sep. 1989.*

Primary Examiner — Darren W Ark
Assistant Examiner — Kathleen Alker
(74) *Attorney, Agent, or Firm* — Mitchell Intellectual Property Law, PLLC

(57) ABSTRACT

A rodent trap mounting platform is provided to which a snap trap can be attached. The platform in turn includes at least one attaching member for attaching the platform, with attached snap trap, to another surface, such as the surface of a dumpster, trash can, or other surface. In one embodiment, the platform is integrally molded into the wall of a bait box.

10 Claims, 3 Drawing Sheets

(56) References Cited

U.S. PATENT DOCUMENTS

| | | | |
|---|---|---|---|
| 6,058,646 A | 5/2000 | Bishoff et al. | |
| 6,082,042 A | 7/2000 | Issitt | |
| 6,389,738 B1 * | 5/2002 | Denny et al. | 43/58 |
| 6,397,517 B1 | 6/2002 | Leyerle et al. | |
| 6,493,988 B1 | 12/2002 | Johnson | |
| 6,574,912 B1 * | 6/2003 | Johnson | 43/88 |
| 6,585,212 B2 * | 7/2003 | Carnevali | 248/346.07 |
| 6,618,983 B1 | 9/2003 | Spragins | |
| 6,789,352 B2 | 9/2004 | Price et al. | |
| 6,874,274 B2 | 4/2005 | Townsend | |
| 7,165,353 B2 | 1/2007 | Matts et al. | |
| 7,363,744 B2 | 4/2008 | Kness et al. | |
| D587,779 S | 3/2009 | Cink | |
| 7,980,023 B2 | 7/2011 | Nelson et al. | |
| 2004/0088905 A1 | 5/2004 | Price et al. | |
| 2004/0187377 A1 * | 9/2004 | Gardner, Jr. | 43/114 |
| 2005/0028431 A1 | 2/2005 | Hoyes et al. | |
| 2005/0097811 A1 | 5/2005 | Scribner | |
| 2006/0117644 A1 | 6/2006 | Hoyes et al. | |
| 2006/0156617 A1 | 7/2006 | Hale | |
| 2008/0072475 A1 | 3/2008 | Nelson et al. | |
| 2008/0210835 A1 | 9/2008 | Bagnall | |
| 2009/0100744 A1 | 4/2009 | Endepois | |
| 2009/0307963 A1 | 12/2009 | Abbas | |
| 2010/0018105 A1 | 1/2010 | Gauker et al. | |
| 2010/0031557 A1 | 2/2010 | Vickery et al. | |
| 2010/0050498 A1 | 3/2010 | Nelson et al. | |
| 2010/0162614 A1 | 7/2010 | Cink et al. | |
| 2010/0301183 A1 * | 12/2010 | Carnevali | 248/346.04 |
| 2011/0226921 A1 | 9/2011 | Patterson | |
| 2011/0239526 A1 | 10/2011 | Nelson et al. | |
| 2012/0036763 A1 | 2/2012 | Kay | |

FOREIGN PATENT DOCUMENTS

| | | |
|---|---|---|
| GB | 1503304 | 3/1978 |
| KR | 100912225 | 8/2009 |
| WO | 9963812 | 12/1999 |
| WO | 2005115140 | 12/2005 |
| WO | 2008035304 | 3/2008 |
| WO | 2010033908 | 3/2010 |
| WO | 2012021585 | 2/2012 |

* cited by examiner

RODENT TRAP MOUNTING MEMBER AND METHOD

FIELD OF THE INVENTION

The present invention pertains to the field of animal pest control devices.

BRIEF SUMMARY OF THE INVENTION

In the present invention, a rodent trap mounting platform is provided to which a snap trap can be attached. The platform in turn includes at least one attaching member for attaching the platform, with attached snap trap, to another surface, such as the surface of a dumpster, trash can, or other surface. In one embodiment, the platform is integrally molded into the wall of a bait box.

These and other objects and advantages of the invention will be more fully understood and appreciated by reference to the written description and appended drawings.

DESCRIPTION OF THE PREFERRED EMBODIMENT

Figure 7:
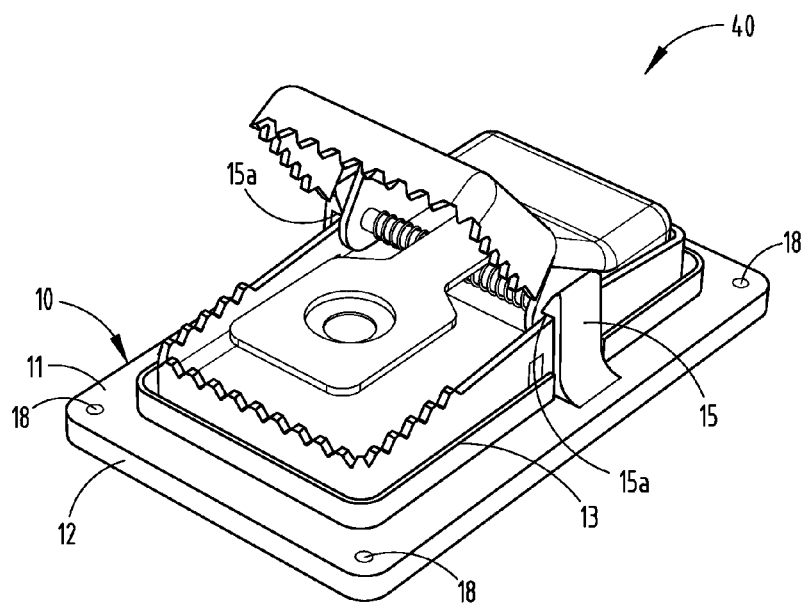
FIG. 7 is a perspective view of the platform with a snap trap mounted thereon.

In a preferred embodiment, the rodent trap mounting platform 10 comprises a generally flat upper wall 11 joined to a relatively short, downwardly depending circumferentially extending side wall 12. (FIG. 1—The relatively short circumferential side wall 12 gives platform 10 a relatively low profile. A retainer wall 13 located on the upper surface of upper wall 11 defines a well 14 for receiving a snap trap, such as snap trap 40 (FIG. 7).

Retainer wall 13 may be continuous, or it may include spaced segments, so long as said spaced segments are arranged to define said well 14 and prevent a snap trap placed therein from shifting to any significant degree on platform 10. The shape of retainer wall 13 is such as to correspond to the shape of the snap trap to be mounted on platform 10. In other words, for a rectangular shaped snap trap such as snap trap 40, well 14 is similarly rectangularly shaped, but just slightly larger than the shape of snap trap 40. Retainer wall 13 need only be tall enough to prevent trap 40 from sliding around on the upper surface of upper wall 11. A height of about a quarter of an inch, for example, has been found sufficient. Preferably, upper wall 11 has dimensions just slightly larger than those of well 14, as well as a similar configuration.

Figure 1:
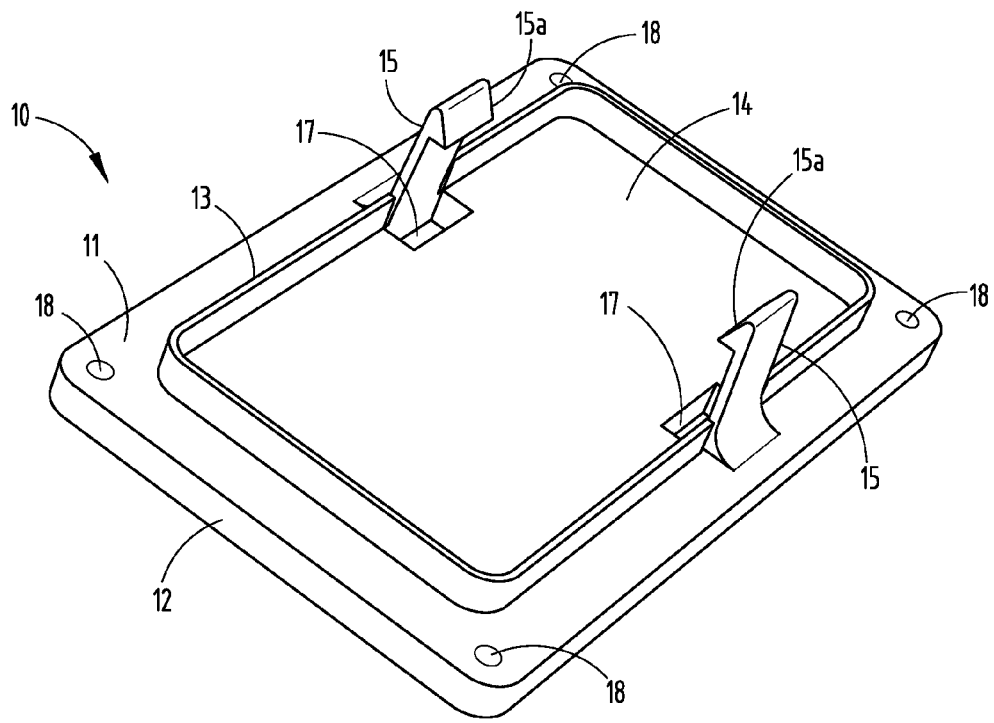
FIG. 1 is a perspective view of a preferred embodiment of the rodent trap mounting platform
Figure 2:
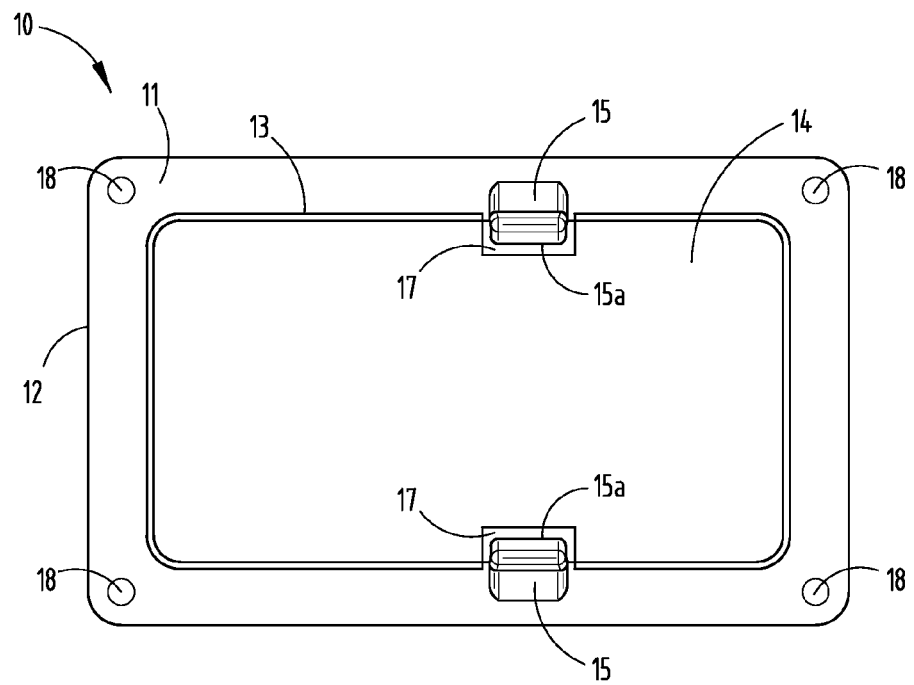
FIG. 2 is a top plan view of the platform.
Figure 3:
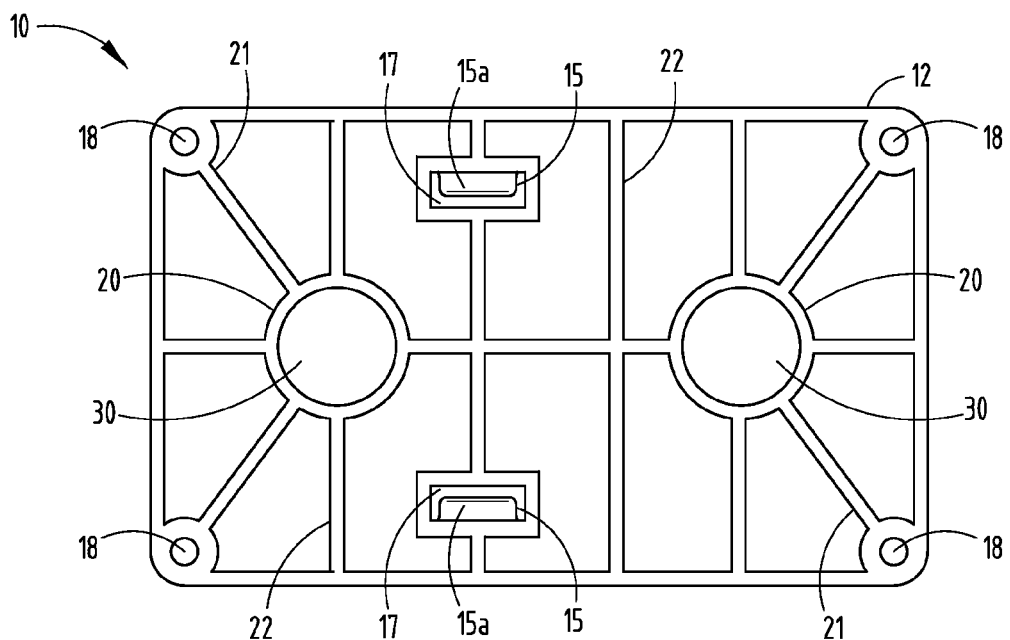
FIG. 3 is a bottom view of the platform.
Figure 4:
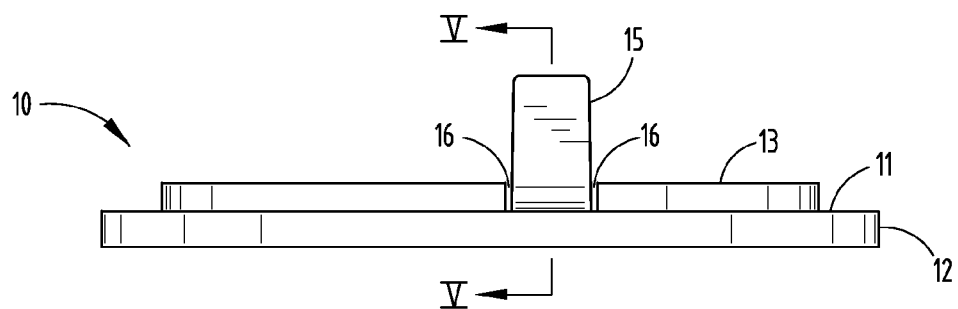
FIG. 4 is a side view of the platform.
Figure 5:
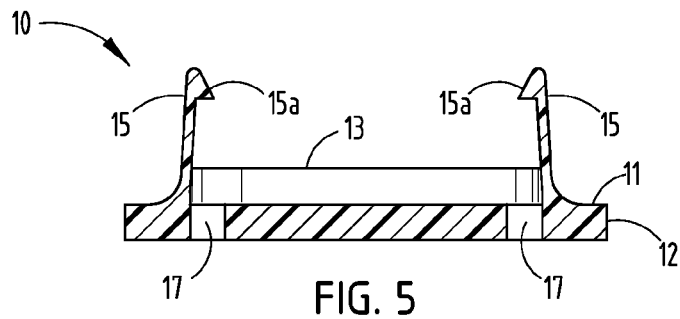
FIG. 5 is a cross sectional view of the platform along the line A-A.
Figure 6:
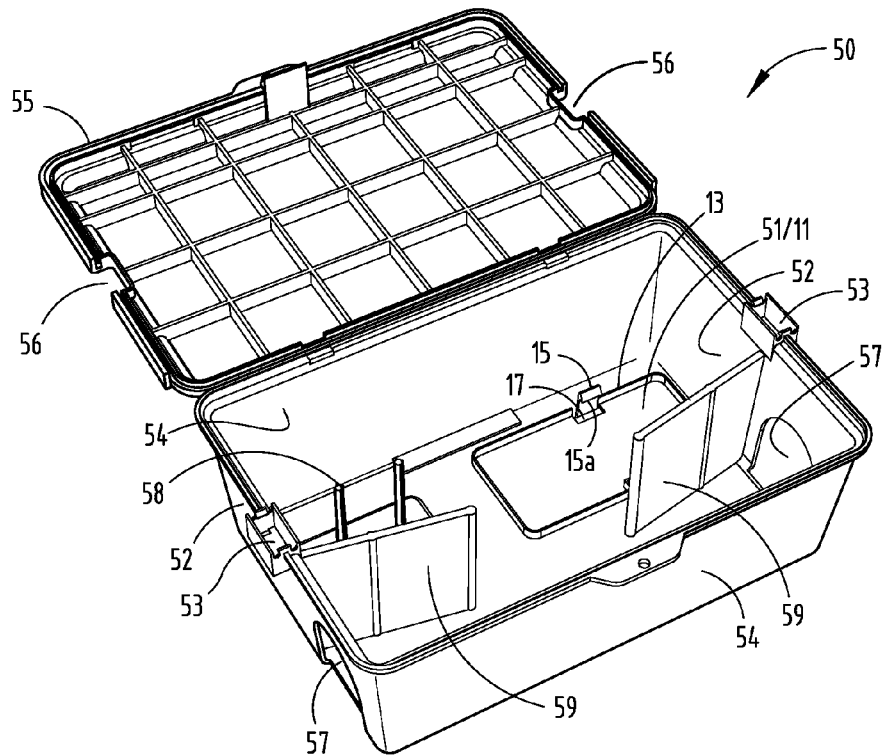
FIG. 6 is a perspective view of an open bait box with the preferred rodent trap mounting platform integrally molded into the bottom wall of the box.

Collinear with said retainer wall 13 are a pair of spaced, flexible retainer clips 15 (FIGS. 2-5). Preferably, there are at least two clips 15 situated on opposing sides of said retainer wall 13, each having an inwardly projecting hook 15a, which will hook over the edge of snap trap 40. Preferably, clips 15 are integrally molded with platform 10, so as to project upwardly from upper wall 11. Clips 15 interrupt wall 13, thereby segmenting it. There is a slight space 16 between each side edge of clip 15 and the adjacent point at which retainer wall 13 is interrupted (FIGS. 2-4). In addition, there is an opening 17 in upper wall 11, generally below said inwardly hook 15a (FIGS. 1, 6). This enhances the flexibility of clips 15, and facilitates molding the hook ends 15a of clips 15. Each said hook 15a includes a downwardly and inwardly sloping upper surface. The slope of said upper surfaces, and the flexibility of clips 15 allows the clips 15 to yield to the trap as it is inserted past the hooks. As the trap 40—passes, it forces clips 15 and hooks 15a aside. When trap 40 has passed, hooks 15a snap back into their original position, and hooks 15a close over the edges of snap trap 40. In this way clips 15 and their hooks 15a ted to hold trap 40 in place.

Platform 10 includes at least one attaching member for attaching it to another surface, such as the surface of a dumpster, a trash can, or other location. In a preferred embodiment, magnets 30 are used as the attaching member. Spaced circular ribs 20 project downwardly from the bottom of upper wall 11. Each of the circles defines a magnet receiving well, sized to receive a magnet 30, so that the bottom of the magnet is generally flush with the edge of side wall 12. The magnets are strong enough that the position of the trap is not significantly disturbed by the triggering of the trap, nor any movement by any animal in said trap, nor by any movement of a surface to which the base is attached. Reinforcing ribs 21 project radially from said circular ribs 20 to help strengthen platform 10. Similarly there are laterally extending ribs 22 extending across the width of platform 10.

In an alternative embodiment, platform 10 is integrally molded into the bottom wall 51 of bait box 50 (FIG. 6). The upper wall 11 of platform 10 is merged into and is a part of bottom wall 51 of bait box 50. Trap retainer wall 13 projects upwardly from box bottom wall 51, as do opposed trap retainer clips 15. Box bottom wall 51 includes openings 17 below the hook portions 15a at the top of clips 15. Attachment members may be located on the bottom of box bottom wall 51, but are preferably located in the magnet receiving wells 53 at the top center of the end walls 52 of the box. Side walls 54 join end walls 52, and a cover 55 facilitates closure of the bait box 50. Notches 56 in the ends of cover 55 prevent the cover 55 from covering attachment magnets located in magnet receiving wells 53, so that the magnets may effectively attach the bait box to a dumpster. As an alternative attachment device, screw holes 18 are located at each corner of platform 10 (FIGS. 1 and 7), which facilitate a more permanent mounting of platform 10 to another surface, including e.g. a non-ferrous surface.

An opening 57 into bait box 50 is located near the bottom corner of each end wall 52, to allow the rodent into box 50. Bait retaining spikes or poles 58 project upwardly from bottom wall 51, for receiving bait thereon. Bait spikes 58 are located towards one end wall 52, while snap trap retaining wall 13 is located towards the opposite end wall. A baffle plate 59 extends inwardly from each end wall 52, to separate the bait area and snap trap area from their respective adjacent openings 57. There is a space between the ends of baffle plates 59 which allow rodents to enter either the poison bait area or the snap trap area of the bait box. Once the rodent has entered the trap areas, the baffle plates 59 also restrict egress, forcing the rodent to die in situ of poison, or be trapped and killed by snap trap 40 located in the trap receiving well 14 defined by trap retaining wall 13.

Although the present invention has been described in detail with regard to the exemplary embodiments thereof and accompanying drawings, it should be apparent to those skilled in the art that various modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A rodent trap mounting platform which is not itself a component of an independently operable rodent trap said rodent trap mounting platform comprising:
   an upper surface and a bottom side;
   a trap retaining wall on said upper surface, said trap retailing wall defining a retaining well for receiving said rodent trap on said platform, said retaining well being dimensioned to prevent said rodent trap from significantly sliding about on said platform;
   at least one trap attaching member for releasably attaching an independently operable rodent trap to said platform upper surface, said at least one trap attaching member comprising a pair of clips for holding said rodent trap in said retaining well, one on each of two opposite sides of said retaining well;
   a second attaching member for releasably attaching said platform to another surface, whereby a rodent trap can be releasably mounted to surfaces to which it would otherwise not be attachable, said second attaching member comprising at least one magnet mounted on said bottom side of said platform; and a magnet receiving well formed on said bottom side of said platform for receiving said at least one magnet.

2. The rodent trap mounting platform of claim 1 in which each said clip projecting upwardly from said upper surface includes a hook projecting inwardly toward the other of said clips, over said well; said platform including an opening therethrough located below each said hook to facilitate molding of said hook and for enhancing flexibility of each said clip.

3. The rodent trap mounting platform of claim 2, with each said hook including a downwardly and inwardly sloping upper surface, whereby a rodent trap can be positioned above said clips and forced down between them, forcing said clips to flex out of the way as the rodent trap slides over said downwardly and inwardly sloping upper surfaces of said hooks, and yet allowing said clips to snap back into position retaining said rodent trap in said well after said trap has passed by said hooks.

4. A rodent trap mounting platform which is not itself a component of an independently operable rodent trap, said rodent trap mounting platform comprising:
   an upper surface and a bottom side;
   a trap retaining wall on said upper surface, said trap retaining wall defining a retaining well for receiving said rodent trap on said platform, said retailing well being dimensioned to prevent said rodent trap significantly sliding about on said platform;
   at least one trap attaching member for releasably attaching an operable rodent trap to said platfonm upper surface, said at least one trap attaching member comprising a pair of clips for holding said rodent trap in said retaining well, one on each of two opposite sides of said retaining well; each said clip projecting upwardly from said upper surface includes a hook projecting inwardly toward the other of said clips, over said well; said platfonm including an opening these through located below each said hook to facilitate molding of said hook and for enhancing flexibility of each said clip;
   a second attaching member for releasably attaching said platform to another surface whereby a rodent trap can be releasably mounted to surfaces to which it would otherwise not be attachable said second attaching member comprising at least one magnet mounted on said bottom side of said platform; and a magnet receiving well formed on said bottom side of said platform for receiving said at least one magnet.

5. The rodent trap mounting platform of claim 4, with each said hook including a downwardly and inwardly sloping upper surface, whereby said rodent trap can be positioned above said clips and forced down between them, forcing said clips to flex out of the way as the rodent trap slides over said downwardly and inwardly sloping upper surfaces of said hooks, and yet allowing said clips to snap back into position retaining said rodent trap in said well after said trap has passed by said hooks.

6. A method for trapping rodents comprising:
   providing a rodent trap mounting platform which is not itself a component of an independently operable rodent trap, said rodent trap platform comprising;
   an upper surface and a bottom side, trap retaining wall on said upper surface said trap retaining wall defining a well for receiving said rodent trap on said platform said well being dimensioned to prevent said rodent trap from significantly sliding about on said platform at least one trap attaching member for releasably attaching an independently operable rodent trap to said platform upper surface comprising a pair of clips for holding said rodent trap in said well, one on each of two opposite sides of said well, and a second attaching member for releasably attaching said platform to another surface, said second attaching member comprising at least one magnet mounted on said bottom side of said platform said rodent trap mounting platform including a magnet receiving well formed on said bottom side of said platform for receiving said at least one magnet;
   attaching said rodent trap to said platform; and
   attaching said platform via said second attaching member, to another surface in a location frequented by rodents.

7. The method of claim 6 in which each said clip projecting upwardly from said upper surface and includes a hook projecting inwardly toward the other of said clips, over said well; said platform including an opening therethrough located below each said hook to facilitate molding of said hook and for enhancing flexibility of each said clip.

8. The method of claim 7 in which said rodent trap mounting platform comprises:
   each said hook including a downwardly and inwardly sloping upper surface, whereby said rodent trap can be positioned above said clips and forced down between them, forcing said clips to flex out of the way as the rodent trap slides over said downwardly and inwardly sloping upper surfaces of said hooks, and yet allowing said clips to snap back into position retaining said rodent trap in said well after said trap has passed by said hooks.

9. A method for trapping rodents comprising:
   providing a rodent trap mounting platform which is not itself a component of an independently operable rodent trap said rodent trap mounting platform comprising:
   an upper surface and a bottom side, a trap retaining wall on said upper surface, said trap retaining wall defining a well for receiving said rodent trap on said platform, said well being dimensioned to prevent said rodent trap from significantly sliding about on said platform, at least one trap attaching member for releasably attaching an independently operable rodent trap to said platform upper surface comprising a pair of clips for holding said rodent trap in said well one on each of two opposite sides of said well each said clip projecting upwardly from said upper surface includes a hook projecting inwardly toward the other of said clips, over said well; said platform including an opening therethrough located below each said hook to facilitate molding of said hook and for enhancing flexibility of each said clip, and a second attaching member for releasably attaching said platform to another surface, said second attaching member comprising at least one magnet mounted on said bottom side of said platform, said rodent trap mounting platform including a magnet receiving well formed on said bottom side of said platform for receiving said at least one magnet;

attaching said rodent trap to said platform; and attaching said platform via said second attaching member, to another surface in location frequented by rodents.

10. The method of claim 9 in which said rodent trap mounting platform comprises:

each said hook including a downwardly and inwardly sloping upper surface, whereby said rodent trap can be positioned above said clips and forced down between them, forcing said clips to flex out of the way as the rodent trap slides over said downwardly and inwardly sloping upper surfaces of said hooks, and yet allowing said clips to snap back into position retaining said rodent trap in said well after said trap has passed by said hooks.

* * * * *